United States Patent [19]

Tajima et al.

[11] Patent Number: 4,593,852

[45] Date of Patent: Jun. 10, 1986

[54] AIR CONDITIONER FOR AUTOMOBILE

[75] Inventors: Katsuichirou Tajima, Sano; Kosei Matsuda, Tatebayashi, both of Japan

[73] Assignee: Nihon Radiator Co., Ltd., Tokyo, Japan

[21] Appl. No.: 686,248

[22] Filed: Dec. 26, 1984

[30] Foreign Application Priority Data

Dec. 29, 1983 [JP] Japan .......................... 58-201639[U]

[51] Int. Cl.$^4$ ............................................... B60H 1/02
[52] U.S. Cl. ................................ 237/12.3 A; 98/2.08; 237/81
[58] Field of Search ...................... 236/13; 237/12.3 B, 237/12.3 A, 81; 98/2, 2.05, 2.08; 165/42, 43

[56] References Cited

FOREIGN PATENT DOCUMENTS 131309 8/1982 Japan .

Primary Examiner—Henry Bennett
Attorney, Agent, or Firm—Gordon W. Hueschen

[57] ABSTRACT

An air conditioner for an automobile, characterized by having an opening of a defrost duct for guiding air toward the inner face of a windshield formed in an upper portion of a heater unit, an opening of a foot duct for guiding air toward an automobile occupant's foot rest formed in a lower portion of said heater unit, a heater core incorporated in a central portion of said heater unit, a first mixing chamber formed in the proximity of said opening of said defrost duct and second mixing chamber formed in the proximity of said opening of said foot duct both within said heater unit, a first mix door for adjusting the amount of air flowing into said heater core and the amount of air bypassing said heater core and directly flowing into said first mixing chamber attached rotatably to the front side of an air inlet face of said heater core, a second mix door for adjusting the amount of air flowing through said core heater into said second mixing chamber and the amount of air bypassing said heater core and flowing directly into said second mixing chamber and a third mix door for apportioning the air discharge side of said heater core, said first, second, and third mix doors severally connected to temperature-adjusting levels within the automobile interior, and the opening degree of said first mix door in response to the stroke of the corresponding temperature-adjusting lever allowed to surpass that of said second mix door.

12 Claims, 6 Drawing Figures

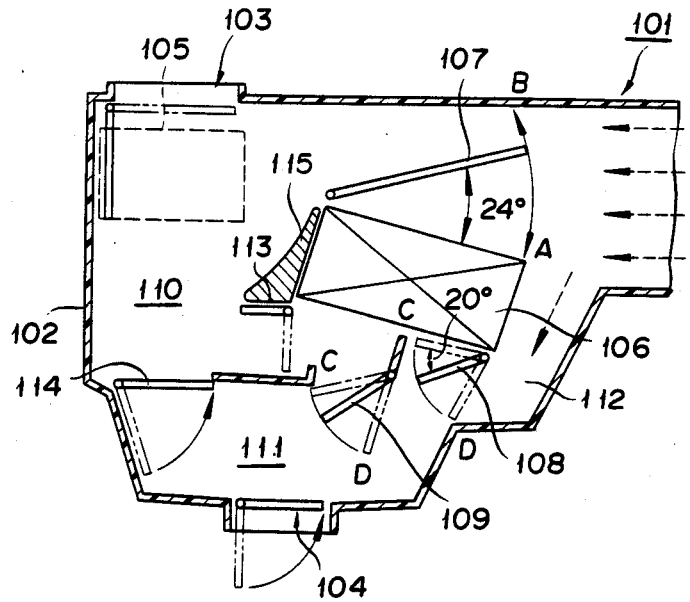
FIG. 3
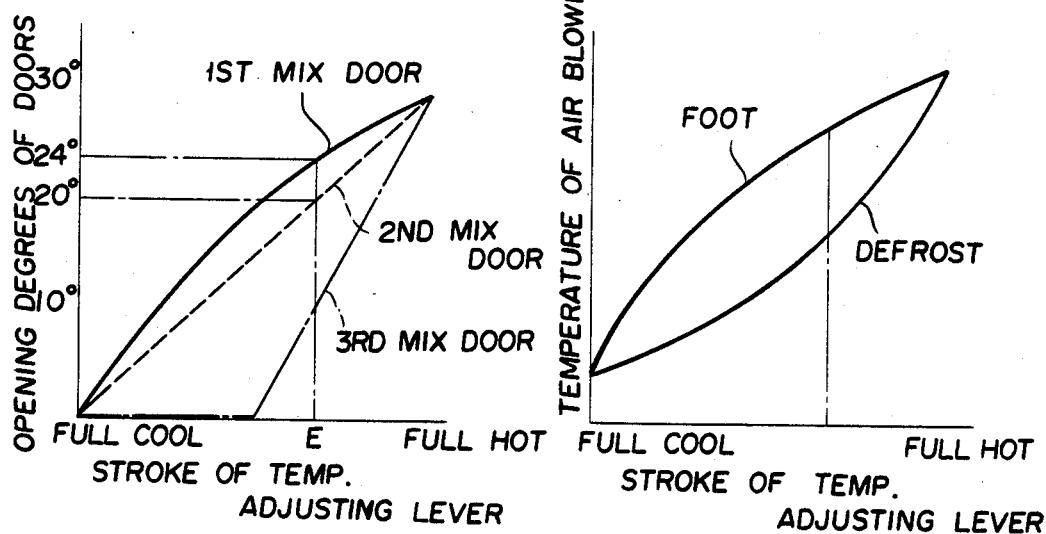
FIG. 4
FIG. 5

AIR CONDITIONER FOR AUTOMOBILE

BACKGROUND OF THE INVENTION

1. Field of the Invention

This invention relates to an air conditioner for an automobile. More particularly, this invention relates to an air conditioner for an automobile, which reduces the difference between the temperature of the air blown through a defrost duct against the inner face of a windshield and a temperature of the air blown through a foot duct against the occupant's foot rest and, at the same time, moderates change of temperature.

2. Description of Prior Art

The air conditioner for the automobile generally is provided with a heater unit and an intake unit for feeding air to the heater unit as disclosed by Japanese Utility Model Application Laid-open No. SHO 57(1982)-131309. The intake unit incorporates therein a fan driven by a motor and is provided with an internal air inlet for admitting the internal circulation current and an external air inlet for admitting the external air, which inlets are selectively switched by an intake door disposed further inside. Inside the heater unit is incorporated a heater core adapted to heat the air flowing into the heater unit with the heat derived from an engine cooling water. In the proximity of this heater core is disposed a mix door which adjusts the amount of air flowing into the heater core and the amount of air allowed to bypass the heater core. Where the air conditioner is expected further to cool the car interior, a cooler unit is incorporated on the upstream side of the heater unit.

FIG. 1 is a schematic diagram illustrating a conventional heater unit 1. A unit case 2 is provided in an upper portion thereof with an opening 3 for a defrost duct, in a lower portion thereof with an opening 4 for a foot duct, and in a lateral portion thereof with an opening 5 for a vent duct respectively. The defrost duct serves to blow air along the inner face of a windshield and keep the windshield from clouding, the foot duct to blow air toward the occupant's foot rest, and the vent duct to blow air into the car interior through a ventilator (not shown) incorporated in the instrument panel opposed to the occupant's seat. The unit case 2 of the heater unit 1 is provided at the center of the interior thereof with a heater core 6. With the heater core 6 as the center, a first mixing chamber 10 is formed above the core heater 6 in the proximity of the opening 4 for the foot duct. To the front side of the air inlet face of the heater core 6, a first mix door 7 is rotatably attached. By this first mix door 7, the ratio between the amount of the air flowing into the heater core 6 and the amount of the air bypassing the heater core 6 and flowing into the first mixing chamber 10 is adjusted. On the air discharge side of the heater core 6, a second mix door 8 for adjusting the amount of the air heated by passage through the heater core 6 fed into the second mixing chamber 11 and the amount of the air caused to bypass the heater core 6 and fed through a bypass route 12 into the second mixing chamber 11 and a third mix door 9 for adjusting the amount of the air heated by passage through the heater core 6 and then caused to flow into the first mixing chamber 10 and the amount of the same heated air caused to flow into the second mixing chamber 11 are rotatably attached.

Between the first mixing chamber 10 and the third mix door 9, a check valve adapted to permit advance into the first mixing chamber 10 of the air which has flowed through the heater core 6 and obstruct the flow of air from the first mixing chamber 10 to the third mix door 9. By this check valve 13, the flow of air from the first mixing chamber 10 to the third mix door 9 is prevented.

Between the first mixing chamber 10 and the second mixing chamber 11, a communicating door 14 is rotatably attached. This door 14 is completely opened while in a vent mode and a defrost mode and completely closed while in the other modes, i.e. a bi-level mode, a foot mode and a heater mode. The numeral symbol 15 denotes a guide wall adapted to preclude the effect of eddy from being exerted upon the check valve 13. These mix doors 7, 8 and 9 are adapted to be operated by the so-called temperature-adjusting levers disposed on the instrument panel in the car interior (not shown) to be manipulated by the car occupant.

In the conventional heater unit constructed as described above, it is desired to blow air through the defrost duct 3 against the inner face of the windshield and, at the same time, blow air through the foot duct against the occupant's foot rest as shown in FIG. 1, only a slight move of the temperature adjusting level from the full hot position for the maximum degree of space warming towrd the full cool side for the maximum degree of space cooling in the so-called heater mode has a possibility of sharply lowering the temperature of the air discharged through the defrost duct as shown in FIG. 2A to an extent of degrading the demisting function and adversely affecting the sensation of air-conditioning caused on the part of the occupant. The operating properties of the first, second and third mix doors 7, 8 and 9 exhibited under the foregoing condition vs. the position of the temperature-adjusting lever are illustrated in FIG. 2B.

An object of this invention, therefore, is to provide a novel air-conditioner for an automobile.

Another object of this invention is to provide an air conditioner for an automobile, so constructed that when a temperature-adjusting lever is operated to establish the heater mode for enabling air to be blown simultaneously through a defrost duct and a foot duct, the air blown out consequently through the defrost duct into the car interior is not suffered to experience any sharp fall of temperature.

SUMMARY OF THE INVENTION

The objects described above are accomplished by an air conditioner for an automobile, which is characterized by having an opening of a defrost duct for guiding air toward the inner face of a windshield formed in an upper portion of a heater unit, an opening of a foot duct for guiding air toward an automobile occupant's foot rest formed in a lower portion of a heater unit, a heater core incorporated in a central portion of the heater unit, a first mixing chamber formed in the proximity of the opening of the defrost duct and a second mixing chamber formed in the proximity of the opening of the foot duct both within the heater unit, a first mix door for adjusting the amount of air flowing into the heater core and the amount of air bypassing the heater core and directly flowing into the first mixing chamber attached rotatably to the front side of an air inlet face of the heater core, a second mix door for adjusting the amount of air flowing through the core heater into the second mixing chamber and the amount of air bypassing the heater core and flowing directly into the second mixing chamber and a third mix door for apportioning the air emanating from the heater core to the first mixing chamber and the second mixing chamber attached rotatably on air discharge side of the heater core, the first, second and third mix doors severally connected to temperature-adjusting levels within the automobile interior, and the opening degree of the first mix door in response to the stroke of the corresponding temperature-adjusting lever allowed to surpass that of the second mix door.

BRIEF DESCRIPTION OF THE DRAWINGS

FIG. 3 is a schematic cross section illustrating one embodiment of the present invention, FIG. 4 is a graph showing the opening degrees of first, second and third mix doors vs. the stroke of the temperature-adjusting lever in the present invention, and FIG. 5 is a graph showing the temperature-adjusting property of this invention.

DESCRIPTION OF PREFERRED EMBODIMENT

Figure 1:
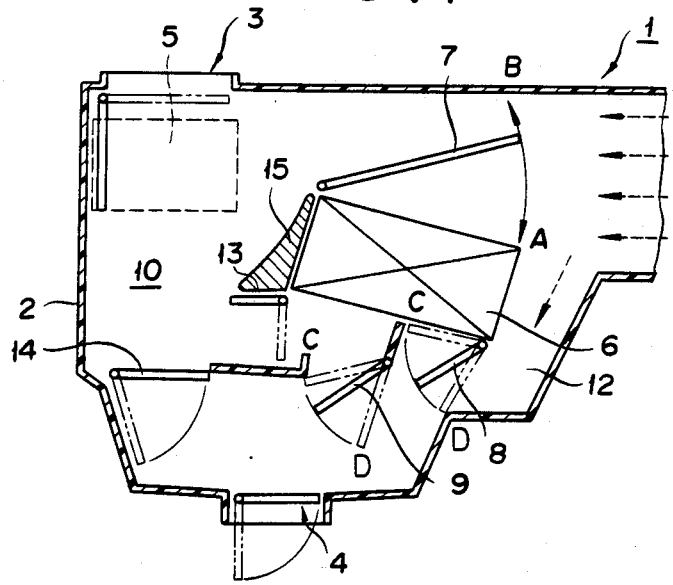
FIG. 1 is a schematic cross section illustrating a conventional heater unit.
Figure 2A:
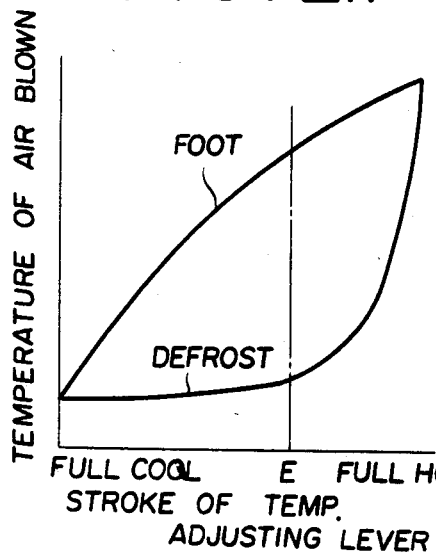
FIG. 2A is a graph showing the temperatue-adjusting property of the heater unit of FIG. 1.
Figure 2B:
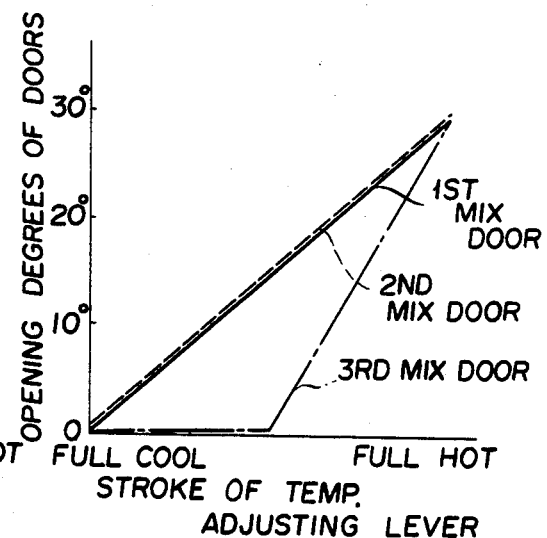
FIG. 2B is a graph showing the opening degrees of first, second and third mix doors vs. the stroke of the temperature-adjusting lever in the heater unit of FIG. 1.

Now, the present invention will be described below with reference to the embodiment of this invention illustrated.

In a heater unit 101 of this invention which is shown in FIG. 3 a unit case 102 of the heater unit 101 is provided in an upper portion thereof with an opening 103 of a defrost duct, in a lower portion thereof with an opening 104 of a foot duct, and in a lateral portion thereof with an opening 105 of a vent duct respectively. The defrost duct serves to blow air along the inner face of a windshield and keep the windshield from clouding, the foot duct to blow air against an automobile occupant's foot rest, and the vent duct to blow air into the automobile interior through a ventilator incorporated in an instrument panel opposed to the occupant's seat.

The heater unit 101 has a heater core 106 incorporated in the central portion of the case interior. With the heater core 106 as the center, a first mixing chamber 110 is formed in the proximity of the opening 103 of the defrost duct above the heater core 106 and a second mixing chamber 111 formed in the proximity of the opening 104 of the foot duct below the heter core 106. To the front side of the air inflow face of the heater core 106, a first mix door 107 is rotatably attached. This first mix door 107 serves to adjust the ratio between the amount of the air flowing into the heater core 106 and the amount of the air caused to bypass the heater core 106 and flow directly into the first mixing chamber 110. On the air discharge side of the heater core 106, a second mix door 108 for adjusting the amount of the air heated by passage through the heater core 106 and fed into the second mixing chamber 111 and the amount of the air flowing via a bypass route 112 into the second mixing chamber 111 instead of flowing through the heater core 106 and a third mix door 109 for adjusting the amount of the air heated by passage through the heater core 106 and caused to flow into the first mixing chamber chamber 110 or into the second mixing chamber 111 are rotatably attached.

Between the first mixing chamber 110 and the third mix door is attached a check valve 113 which permits advance into the first mixing chamber 110 of the air which has flowed through the heater core 106 and obstructs the flow of air from the first mixing chamber 110 to the third mix door 109. By this check valve 113, the flow of the air from the first mixing chamber 110 to the third mix door 109 is prevented.

Between the first mixing chamber 110 and the second mixing chamber 111, a communicating door 114 is rotatably attached. This door 114 is completely opened while in the vent mode and the defrost mode and completely closed while in the other modes, i.e. the bi-level mode, the foot modes and the heater mode. The numerical symbol 115 denotes a guide wall which prevents the effect of eddy from being exerted upon the check valve 113. These mix doors 107, 108 and 109 are adapted to be operated by the temperature-adjusting levers disposed on the instrument panel in the car interior (not shown) to be manipulated by the car occupant.

The range of rotation of the first mix door is about 15 to 90 degrees, preferably about 30 degrees, between the position A and the position B and that of the second mix door 108 and that of the third mix door 109 are each about 15 to 90 degrees, preferably about 30 degrees, between the position C and the position D. Then, based on the stroke of the temperature-adjusting lever, the opening degree of the second mix door 108 is always less than that of the first mix door 107 except for the completely opened position A and the completely closed position B of the first mix door 107. When the temperature-adjusting lever is set at the position E as shown in FIG. 4, the opening degree of the second mix door 108 is about 20 degrees and that of the first mix door 107 is about 24 degrees. The opening degree of the second door advantageously can be from about 10 to 60 degrees and that of the first mix door from about 12 to 72 degrees whereby the degree of opening of the first mix door is always 2 to 12 degrees larger than that of the second mix door. When the temperature-adjusting lever is set substantially at its central position, the third mix door 109 is closed so that the air which has flowed through the heater core 106 will not flow into the second mixing chamber 111. The opening degrees of the first mix door 107, the second mix door 108, and the third mix door vs. the stroke or the temperature-adjusting lever are as shown in FIG. 4.

In the construction described above, when the temperature-adjusting lever is set to the position E, for example, the opening degree of the first mix door 107 is about 2 to 12 degrees, preferably about 4 degrees, larger than that obtained in the conventional air conditioner and, consequently, the amount of hot air which exits the heater core 106 and then flows into the first mixing chamber 110 and the second mixing chamber 111 is proportionally increased and the amount of cold air which has bypassed the heater core 106 and then flows into the first mixing chamber 110 is decreased and the temperature of the air discharged from the opening 103 of the defrost duct communicating with the first mixing chamber is elevated. As the result, the fall of the temperature of the air blown out of the defrost duct between the full hot (position B) and the position E is moderated as shown in FIG. 5.

In accordance with the present invention, the air conditioner has an opening of a defrost duct for guiding air toward the inner face of a windshield formed in an upper portion of a heater unit, an opening of a foot duct for guiding air toward an automobile occupant's foot rest formed in a lower portion of the heater unit, a heater core incorporated in a central portion of the heater unit, a first mixing chamber formed in the proximity of the opening of the defrost duct and a second mixing chamber formed in the proximity of the opening of the foot duct both within the heater unit, a first mix door for adjusting the amount of air flowing into the heater core and the amount of air bypassing the heater core and directly flowing into the first mixing chamber attached rotatably to the front side of an air inlet face of the heater core, a second mix door for adjusting the amount of air flowing from the heater core into the second mixing chamber and the amount of air bypassing the heater core and flowing directly into the second mixing chamber and a third mix door for apportioning the air emanating from the heater core to the first mixing chamber and the second mixing chamber attached rotatably on air discharge side of the heater core, the first, second and third mix doors severally connected to temperature-adjusting levels within the automobile interior, and the opening degree of the first mix door in response to the stroke of the corresponding temperature-adjusting lever being always greater than that of the second mix door. Thus, the change caused by the operating stroke of the temperature-adjusting lever in the temperature of the air blown against the inner face of the difference between the temperature of the air blown against the automobile occupant's foot rest through the foot duct and that of the air blown out through the defrost duct is decreased, with the result that the temperature within the automobile interior will be controlled all the more comfortably.

What is claimed is:

1. In an air conditioner for an automobile comprising a heater unit characterized by having an opening of a defrost duct formed in an upper portion thereof for guiding air toward the inner face of a windshield, an opening of a foot duct formed in the lower portion of said heater unit for guiding air toward an automobile occupant's foot rest, a heater core incorporated in a central portion of said heater unit, a first mixing chamber formed in the proximity of said opening of said defrost duct and a second mixing chamber formed in the proximity of said opening of said foot duct both within said heater unit, a first mix door for adjusting the amount of air flowing into said heater core and the amount of air bypassing said heater core and directly flowing into said first mixing chamber, said first mix door being attached rotatably to the front side of an air inlet face of said heater core, a second mix door for adjusting the amount of air flowing through said core heater into said second mixing chamber and the amount of air bypassing said heater core and flowing directly into said second mixing chamber and a third mix door for apportioning the air discharge side of said heater core, said first, second, and third mix doors being severally connected to temperature-adjusting levers within the automobile interior, the improvement in which the opening degree of said first mix door in response to the stroke of the corresponding temperature-adjusting lever is always greater than that of said second mix door except when the first mix door is completely open or completely closed.

2. In a process for operating an air conditioner for an automobile comprising a heater unit characterized by having an opening of a defrost duct formed in an upper portion of said heater unit for guiding air toward the inner face of a windshield, an opening of a foot duct formed in a lower portion of said heater unit for guiding air toward an automobile occupant's foot rest, a heater core incorporated in a central portion of said heater unit, a first mixing chamber formed in the proximity of said opening of said defrost duct and a second mixing chamber formed in the proximity of said opening of said foot duct both within said heater unit, a first mix door for adjusting the amount of air flowing into said heater core and the amount of air bypassing said heater core and directly flowing into said first mixing chamber, said first mix door being attached rotatably to the front side of an air inlet face of said heater core, a second mix door for adjusting the amount of air flowing through said core heater into said second mixing chamber and the amount of air bypassing said heater core and flowing directly into said second mixing chamber and a third mix door for apportioning the air discharge side of said heater core, said first, second, and third mix doors being severally connected to temperature-adjusting levers within the automobile interior, the improvement in which the opening degree of said first mix door in response to the stroke of the corresponding temperature-adjusting lever is always greater than that of said second mix door except when the first mix door is completely open or completely closed.

3. An air conditioner according to claim 1, wherein the opening degree of the first mix door over substantially the full cool to full hot range is 2 to 12 degrees larger than that of the second mix door.

4. An air conditioner according to claim 3, wherein the opening degree of the first mix door over the mid-portion of the full cool to full hot range is about 4 degrees larger than that of the second mix door.

5. An air conditioner of claim 1, wherein the opening degree of the first and second mix doors are respectively delineated by the bold line and the dotted line which originate at the full cool point to terminate at the full hot point of the graph shown in FIG. 4 of the drawings.

6. An air conditioner of claim 5, wherein the opening degree of the third mix door is essentially zero over about the first half of the full cool to full hot range.

7. An air conditioner of claim 1, wherein said first, second, and third mix doors have opening degrees substantially as shown in FIG. 4 over the full cool to full hot range.

8. In a process of claim 2, wherein the opening degree of the first mix door over substantially the full cool to full hot range is 2 to 12 degrees larger than that of the second mix door.

9. In a process of claim 8, wherein the opening degree of the first mix door over the mid-portion of the full cool to full hot range is about 4 degrees larger than that of the second mix door.

10. In a process of claim 2, wherein the opening degree of the first and second mix doors are respectively delineated by the bold line and the dotted line which originate at the full cool point to terminate at the full hot point of the graph shown in FIG. 4 of the drawings.

11. In a process of claim 10, wherein the opening degree of the third mix door is essentially zero over about the first half of the full cool to full hot range.

12. In a process of claim 2, wherein said first, second, and third mix doors have opening degrees substantially as shown in FIG. 4 over the full cool to full hot range.

* * * * *

UNITED STATES PATENT AND TRADEMARK OFFICE
CERTIFICATE OF CORRECTION

PATENT NO. : 4,593,852

DATED : June 10, 1986

INVENTOR(S) : Katsuichirou Tajima and Kosei Matsuda

It is certified that error appears in the above-identified patent and that said Letters Patent is hereby corrected as shown below:

Col. 1, line 58; after "core 6" insert -- and --
Col. 2, line 26; "towrd" should read -- toward --
Col. 3, line 16; "temperatue-adjusting" should read -- temperature-adjusting --
Col. 3, line 53; "heter" should read -- heater --
Col. 4, line 1; delete "chamber" (second occurrence)
Col. 4, line 16; "modes" should read -- mode --
Col. 4, line 46; before "The" insert -- In other words, the opening degree of the third mix door is essentially zero over the first half of the full cool to full hot range. --

Signed and Sealed this

Eighth Day of September, 1987

Attest:

DONALD J. QUIGG

*Attesting Officer*      *Commissioner of Patents and Trademarks*